Jan. 6, 1953 E. I. GHORMLEY 2,624,542
VALVE CONSTRUCTION
Filed Nov. 5, 1948
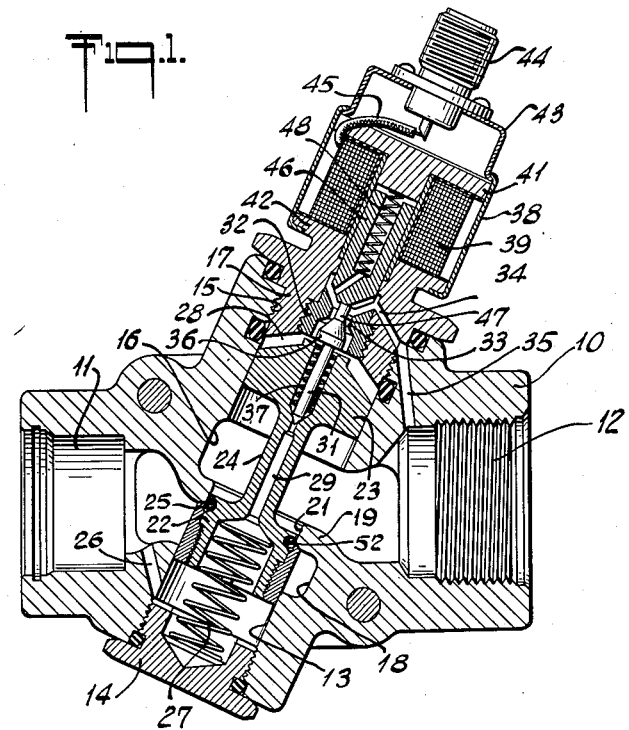
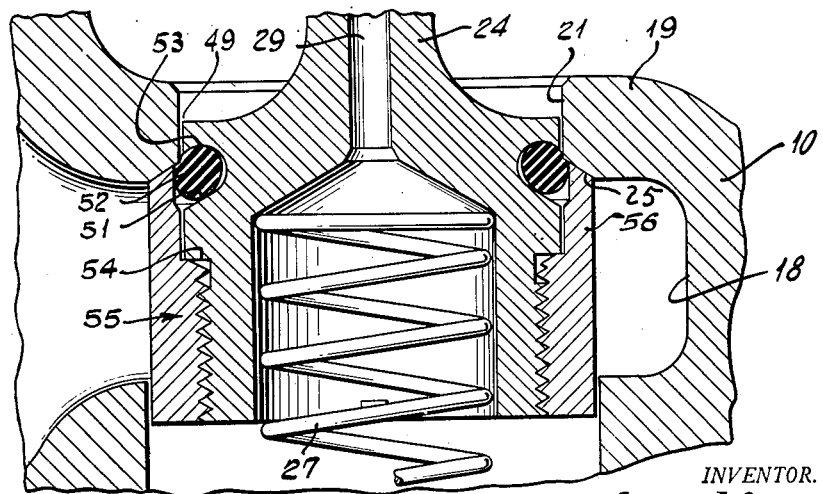
INVENTOR.
EDWIN I. GHORMLEY.
BY J. C. Besinger
HIS ATTORNEY.

Patented Jan. 6, 1953

2,624,542

UNITED STATES PATENT OFFICE 2,624,542

VALVE CONSTRUCTION

Edwin I. Ghormley, Dayton, Ohio, assignor to United Aircraft Products, Inc., Dayton, Ohio, a corporation of Ohio Application November 5, 1948, Serial No. 58,450

4 Claims. (Cl. 251—27)

This invention relates to valves, having reference to control operations for effecting opening and closing of a valve and to structural sealing characteristics of the valve.

It is a principal object of the invention to render practical the use of a ring seal upon a valve which is designed to open in the presence of high pressure.

Valves which function to open and close a port to permit and to deny the flow of pressure fluid therethrough ordinarily are peripherally machined for a close metal to metal contact with a correspondingly machined seat surrounding the port. The necessity for careful working of the valve and valve seat to insure the creating of a tight seal adds materially to the cost of manufacture of the valve unit. Moreover, the effectiveness of the seal is easily lessened or destroyed should the mating surfaces be scarred or foreign matter be deposited thereon. It has been suggested that the metal to metal seal be replaced by a simple ring seal of resilient material placed in a groove on the valve body and protruding therefrom for contact with the valve seat. It was found, however, that high closing pressures upon the valve produced an excessive deflection of the seal material shortening its useful life. Further, and perhaps more importantly in high pressure systems, the first surge of pressure through an opened port frequently gained access to the bottom of the ring seal groove and literally blew the seal from the groove.

With these facts of valve sealing in mind, the instant invention proposes a valve, retaining the best features of the metal to metal and ring seal constructions while obviating the undesirable features thereof. Essentially the valve is characterized by a ring seal construction. There is utilized in connection with the ring seal, however, a retainer or sleeve which is disposed in overlying relation to more than half the length of the ring seal groove whereby to confine the seal within the groove against the effects of pressure surges. Also, the outer end of the sleeve is adapted for contact with the valve seat so that a positive limit is placed on inward or closing movement of the valve, which limit is predetermined to obtain a desired degree of compression of the ring seal. As a further guard against the disrupting effects of pressure surges, the valve body, in advance of the ring seal is allowed to enter the port and define a narrow annular space therein. In the initial phase of the opening movement of the valve, therefore, or during that interval in which the valve body is moving wholly out of the port, the flow of pressure fluid is restricted and surge effects dissipated.

It will be evident that numerous features of advantage are presented by the invention and that other objects are in view, for example, ease and inexpensiveness of manufacture, reliability of operation and simplified replacement. In the latter connection, the aforementioned retainer sleeve may be screw threaded upon the valve body for adjustment thereon and for easy access to the ring seal.

The invention is disclosed as embodied in a pressure fluid operated solenoid controlled valve unit which is further characterized by additional features of novelty including a two-way pilot valve settable to alternative control positions under the influence of the solenoid mechanism.

In the drawings:

Fig. 1 is a view in longitudinal section of a valve unit constructed and arranged in accordance with the present invention; and Fig. 2 is an enlarged fragmentary view, showing details of the valve body assembly.

Referring to the drawings the invention is disclosed in connection with a pressure fluid operated solenoid controlled valve of the kind arranged in pressure fluid conducting lines alternately to permit and to deny flow through the line. The valve unit comprises a body 10 in the form of a unitary casting presenting oppositely disposed inlet and outlet openings 11 and 12 suitably formed to receive screw threaded pipe connectors or the like. Extending angularly through the body 10 is a bore 13 closed at its inner or bottom end by a cap 14. In the outer end of the bore 13 is a counterbore 15 terminating at its inner end in an annular groove 16 communicating with the outlet 12. The outer end of counter-bore 15 is closed by a cap 17. Adjacent its inner or bottom end the bore 13 intersects and communicates with an annular groove 18 opening into the inlet 11.

Separating the annular grooves 16 and 18 is a wall or partition 19 within which is formed a port 21 aligned with the bore 13 and counterbore 15 and through which the inlet 11 may communicate with the outlet 12. Fluid flow through the port 21 is controlled by a valve assembly which includes a body 22 reciprocable within the bore 13 on the inlet side of partition 19, a piston 23 reciprocable within the counter-bore 15 on the outlet side of partition 19 and an integral stem 24 interconnecting the body 22 and the piston 23. The piston 23 is of greater diameter than the body 22. The valve body 22 is designed to cooperate in a manner hereinafter to be described with a seat 25 formed in the partition 19 on the inlet side thereof in surrounding relation to the port 21.

The interior of the body is hollow and opens through the bottom thereof into bore 13. A compression spring 27 is seated in the cap 14 and enters the hollow interior of valve body 22 to urge the valve assembly upward or outward into cooperative relation with seat 25 and so close communication between the inlet 11 and outlet 12. The action of the spring 27 is, in the closed position of the valve, aided by fluid pressure admitted to the bore 13 beneath the body by way of a passage 26 leading from inlet 11.

The cap 17, closing the outer end of counterbore 15, defines in conjunction with piston 23 a pressure chamber 28. The chamber 28 communicates with bore 13 beneath the valve body 22 by way of longitudinal passage 29 in the piston and in the stem 24 interconnecting the piston and the body 22. Flow through the passage 29 is controlled by a needle valve 31. The cap 17 has a longitudinal bore therein in the lower end of which is a plug 32 which is in turn centrally bored to define a port 33. One side of the port 33 communicates with pressure chamber 28 while the other side of port 33 is connected by way of a passage 34 in element 17 and a passage 35 in body 10 to outlet 12. Accordingly, the pressure chamber 28 communicates through passage 29, the lower end of bore 13 and passage 26 with the inlet 11 and also communicates with outlet 12 by way of port 33 and passages 34 and 35. Flow to and from the pressure chamber 28 is controlled by a two-way pilot valve which includes the needle valve 31 cooperative with passage 29 and a poppet valve 36 integral with needle valve 31 and arranged to enter and close port 33. The pilot valve assembly is so constructed and arranged as to be reciprocable between a first position in which the needle valve 31 closes passage 29 and poppet valve 36 opens port 33 and a second position in which needle valve 31 opens passage 29 and poppet valve 36 closes port 33. A spring 37 surrounding needle valve 31 in passage 29 urges the pilot valve assembly to the second described position.

The cap 17 provides a mounting for a solenoid unit comprising a case 38 and an electrically energizable coil 39 wound upon a spool made up of an end plate 41 and a base 42 integrally formed with the cap 17. A closure 43 is mounted upon the plate 41 and in turn provides a mounting for a connector 44 through which extend electrical leads 45 connected to the coil 39. Reciprocable within the coil 39 and retractable therein in response to the energizing of the coil is a plunger 46. The plunger 46 extends downward and inward into contact with a stem 47 on the poppet valve 36 protruding through port 33. The plunger 46 is pressed downward into contact with the stem 47 by a compression spring 48. The spring 48 exceeds the spring 37 in strength. Accordingly, when the coil 39 is de-energized the plunger 46 is effective to move and to return the pilot valve assembly to the first of its above described positions wherein passage 29 is closed and port 33 is opened. When the coil 39 is energized, however, plunger 46 is withdrawn from contact with stem 47, allowing spring 37 to raise the pilot valve assembly to the first of the above described positions wherein passage 29 is opened and port 33 is closed. In the operation of the mechanism the solenoid coil 39 may normally be de-energized. Plunger 46 therefore bears upon the two-way pilot valve with the effect of closing passage 29 and opening port 33. In this position of the parts, pressure chamber 28 is connected to the outlet 12 which is a low pressure area. As a result, the spring 27 and fluid pressure in the bottom of bore 13 is effective to close port 21 through valve body 22 and communication between inlet 11 and outlet 12 is cut off. Now, if the solenoid coil 39 is energized plunger 46 is retracted, allowing the two-way pilot valve to shift to a position closing port 33 and opening passage 29. In response to such action fluid pressure is admitted to pressure chamber 28 from inlet 11 and is allowed to build up therein with the result that the opposing forces represented by spring 27 and the fluid pressure in the bottom of bore 13 are overcome and the valve body 22 is moved downward or inward out of cooperative relation with seat 25. The pressure fluid then may flow directly from inlet 11 to groove 18 and through port 21 to groove 16 and the outlet 12. This position of the parts will prevail so long as solenoid coil 39 remains energized. Upon de-energizing of the coil the parts return to the positions shown in Fig. 1 and flow to the outlet 12 is again cut off.

Returning to a consideration of the valve body 22, there is presented by this invention a construction and arrangement of parts simplifying and improving the closing action of the valve under high pressure operation and reducing the cost of manufacture.

Referring to Fig. 2, the body 22 is of a diameter slightly less than the diameter of the port 21 so that in moving to closed position the body may enter the port leaving a slight clearance, represented by a space 49, between the body and the wall of the port. Adjacent to the upper or outer end of the body 22 is a peripheral groove 51 mounting a ring-seal 52 made of a resilient material, for example synthetic rubber. At its inner or bottom end the groove 51 has a tapered or sloping formation and at its opposite or outer end is undercut to define an overhanging lip 53. Inwardly of the groove 51 the external surface of the body 22 is stepped-down to form a shoulder 54 thereon. Inwardly of the shoulder 54 the body 22 is threaded to receive a complementary threaded sleeve 55. The sleeve 55 abuts the shoulder 54 and has a forwardly projecting skirt portion 56 extending in overlying relation to a substantial part of the groove 51, the outer end of the skirted portion being beveled for complementary engagement with the valve seat 25. Together the sleeve 55 and overhanging lip 53 act to confine the ring-seal 52 within the groove 51 against the effects of fluid pressure which flows past the valve seat 25 when the valve begins to move away from closed position with respect to port 21. The ring-seal 52 is allowed to protrude between the sleeve 55 and lip 53 for contact with the edge of the port 21 which edge presses into the seal as indicated in Fig. 2 and effectively prevents the escape of pressure fluid past the valve in the closed position thereof. The skirted portion 56 of sleeve 55 makes a positive contact with the seat 25 and sustains the principal burden of pressure exerted upon the valve body by the spring 27 and fluid pressure in the bottom of bore 13. Excessive deflection of the material of the ring seal thereby is avoided. The sleeve 55 may be adjustable in this connection to vary the pressure value with which the ring-seal 52 engages the seat 25.

The presence of a portion of valve body 22 within port 21, defining annular space 49, exercises a damping effect on fluid flow during the initial phase of the motion of the valve away from closed position. The resistance to surging pressure afforded by the annular space 49, and the cooperation of sleeve 55 and lip 53 in confining seal 52, effectively prevents dislodgement of the seal from groove 51 when high pressure is admitted from inlet 11 to the port 21.

What is claimed is:

1. A valve arranged to move to a closed position upon an annular seat, including a cylindrical body concentrically disposed with respect to said seat and of a diameter to be received in said seat, a peripheral groove in said body undercut at one end thereof to define an overhanging lip, a resilient O-ring seal in said groove and protruding therefrom to be received in said seat with a lateral contact thereof, and a sleeve mounted on said body to overlie a portion of said groove and to abut said seat, said sleeve and the overhanging lip of said groove acting to confine said seal in said groove against the effects of fluid pressure.

2. In a valve unit, a housing presenting an inlet and an outlet for fluid flowing under pressure, a partition between said inlet and outlet, a port in said partition, a valve seat in surrounding relation to said port and facing said inlet, a cylindrical valve body concentric with said seat and of a diameter to enter said port, a peripheral groove in said body intermediate the ends thereof, a resilient O-ring seal in said groove and protruding therefrom to be received in said port with a lateral contact of said valve seat, a sleeve mounted on said body partly to surround said seal in said groove and to abut said valve seat, a cylinder in said housing receiving said sleeve with a sliding fit, a spring urging said body toward said port to engage said ring seal and said sleeve with said valve seat, one end of said body entering said port under the influence of said spring to define therearound a narrow annular passage, and means for moving said valve body out of and away from said port, fluid flow through said port being restricted in the initial phase of such movement by said annular passage.

3. In a valve unit, a housing presenting an inlet and an outlet for fluid flowing under pressure, a partition between said inlet and outlet, a port in said partition, a valve seat in surrounding relation to said port and facing said inlet, a cylinder in said housing aligned with said port, a valve body in said cylinder of a diameter to enter said port, a peripheral groove in said body intermediate the ends thereof, a resilient O-ring seal in said groove and protruding therefrom to be received in said port with a lateral contact of said valve seat, a sleeve mounted on said body partly to surround said ring seal and to engage said valve seat, said sleeve having a sliding fit in said cylinder, a passage communicating said inlet with said cylinder beneath said body whereby to urge said body toward said port, the outer end of said body entering said port and defining an annular passage therein, and means for moving said body out of and away from said port, fluid flow through said port being restricted in the initial phase of such movement by said annular passage.

4. In a valve unit, a partition presenting a port, a valve seat surrounding said port, a cylindrical valve body reciprocably mounted in concentric relation to said valve seat and of a diameter to be received in said port, a peripheral groove in said body, an O-ring seal in said groove and protruding therefrom to be received in said port with a lateral contact with the edge of said port in response to movement of said body into said port, and a sleeve mounted on said body in position to surround a part of said groove to confine said ring seal therein and to contact and limit against said valve seat outward of said ring seal, the peripheral groove in said body being undercut at one end thereof to form an overhanging lip defining in conjunction with said sleeve a relatively narrow annular space through which said seal may protrude for contact with the edge of said port.

EDWIN I. GHORMLEY.

REFERENCES CITED

The following references are of record in the file of this patent:

UNITED STATES PATENTS

| Number | Name | Date |
|---|---|---|
| 485,984 | Randall | Nov. 8, 1892 |
| 1,055,161 | Geissinger | Mar. 4, 1913 |
| 1,989,341 | Shenton | Jan. 29, 1935 |
| 2,204,808 | McNeal | June 18, 1940 |
| 2,408,006 | Smith | Sept. 24, 1946 |
| 2,414,908 | Smith | Jan. 28, 1947 |
| 2,490,511 | Courtot | Dec. 6, 1949 |